United States Patent [19]

Dugan et al.

[11] 4,222,479

[45] Sep. 16, 1980

[54] CONTAINER CONVEYING AND TRANSFER SYSTEM

[75] Inventors: Larry M. Dugan, Boulder; Danny L. McMillin, Golden, both of Colo.

[73] Assignee: Coors Container Company, Golden, Colo.

[21] Appl. No.: 960,232

[22] Filed: Nov. 13, 1978

[51] Int. Cl.³ .............................................. B65G 47/04

[52] U.S. Cl. .................................... 198/482; 198/689; 101/40

[58] Field of Search ........................ 198/477, 482, 689; 101/38 R, 38 A, 39, 40

[56] References Cited

U.S. PATENT DOCUMENTS

| | | | |
|---|---|---|---|
| 2,921,667 | 1/1960 | Willsey | 198/689 |
| 3,182,998 | 5/1965 | Peterson | 198/689 |
| 3,567,043 | 3/1971 | Sirvet et al. | 198/689 |
| 3,757,926 | 9/1973 | Gendron et al. | 198/689 |
| 3,766,851 | 10/1973 | Sirvet et al. | 198/689 |

*Primary Examiner*—Joseph E. Valenza

*Attorney, Agent, or Firm*—Bruce G. Klaas; Dennis K. Shelton; Richard D. Law

[57] ABSTRACT

A container conveying and transfer system for conveying and transferring decorated containers from a continuously rotatable mandrel wheel of container decorating apparatus to a continuously moving continuous loop container conveying belt member having container holding vacuum cups fixedly mounted thereon in association with an elongated vacuum plenum extending along a container carrying portion of the path of movement of the belt member whereby the containers are transferred from the belt member to pins carried by a continuously moving continuous loop chain member, the belt member being driven in synchronized, timed relationship to the rotatable mandrel wheel and the chain member by vacuum cup attachment nut members received in driving slots in a drive wheel member and in guide slots associated with the vacuum plenum and belt guide wheel members.

24 Claims, 15 Drawing Figures

Fig-2
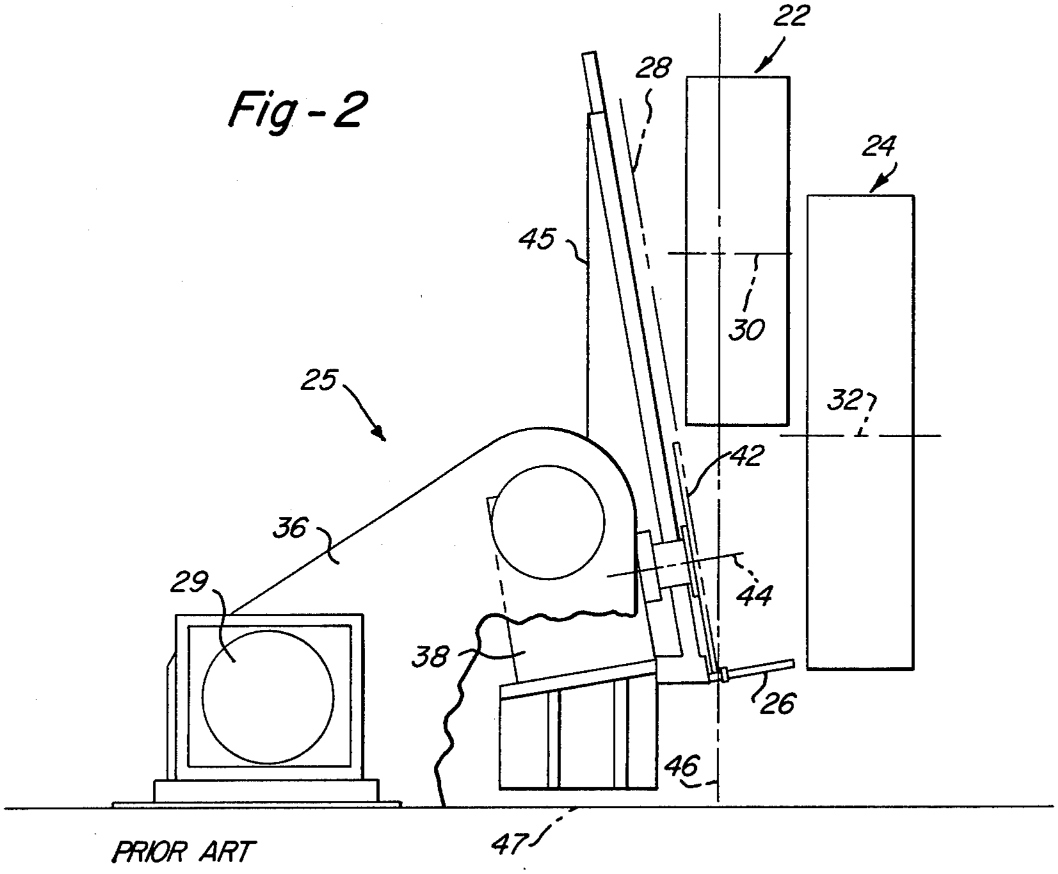
PRIOR ART
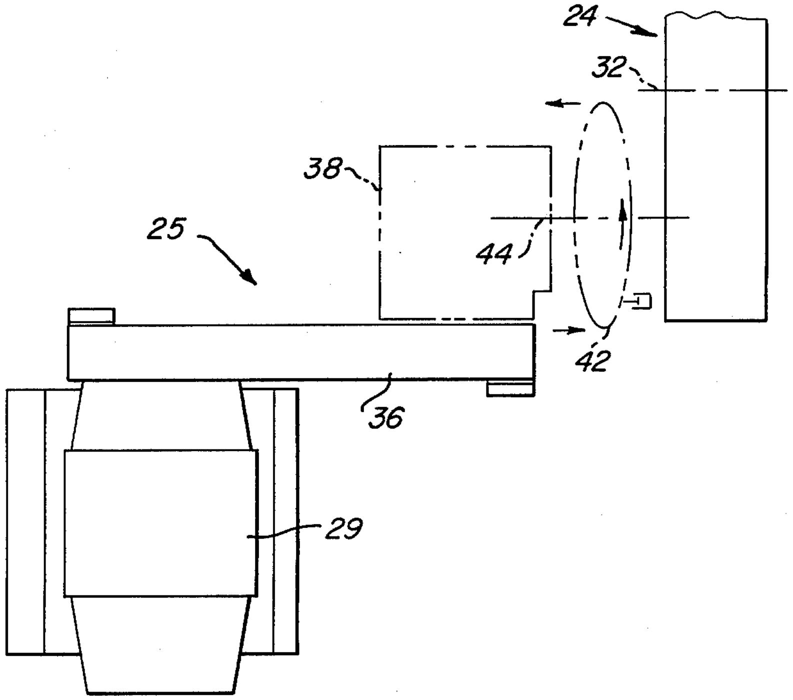
Fig-3
PRIOR ART

CONTAINER CONVEYING AND TRANSFER SYSTEM

BACKGROUND AND SUMMARY OF INVENTION

The present invention generally relates to the container manufacturing art and, more particularly, container conveyor and transfer apparatus used in connection with the decoration of containers such as can body members.

At the present time, can body member type containers, sometimes also referred to as cans, are conventionally decorated by continuously moving decorator apparatus, sometimes also referred to as printing or printer apparatus, which has a continuously rotatable container carrying mandrel wheel with circumferential spaced container carrying mandrel devices for carrying undecorated containers along a first arcuate path of movement from a loading station to a transfer station, with circumjacent ink applying devices being associated with the container along the path of movement thereof to apply ink images onto the outer peripheral container surfaces. The decorated containers are conventionally transferred from the rotatable mandrel wheel to circumferentially spaced support devices on a continuously rotatable container transfer wheel which carries the decorated containers away from the rotatable mandrel wheel along a second arcuate path. The decorated containers are then conventionally directly transferred from the rotatable transfer wheel to longitudinally spaced support pins on a continuously moving container conveyor chain, sometimes referred to as a deco chain, by which the decorated containers are carried to and through an ink curing and drying oven. Examples of prior art apparatus of this type are shown in the following U.S. Pat. Nos. Porterfield 3,016,153; Brigham, et al 3,227,070; Borkmann 3,231,061; Hartmeister 3,261,281; Smith, et al 3,279,360; Brigham, et al 3,300,019; Cartwright 3,469,670; Cvacho, et al 3,496,863; Zurick 3,521,554; Cvacho, et al 3,537,187; Sirvet, et al 3,548,745; Cvacho, et al 3,563,170; Sirvet 3,567,043; Gould 3,586,175; Russell 3,613,571; Sirvet, et al 3,616,778; and Sirvet, et al 3,766,851.

In order to prevent, containers from falling off pins on a chain during conveyance to and through an oven, it has been conventional practice for many years to mount the chain in an inclined position so that the pins are upwardly inclined and hold the containers in an upwardly inclined position thereon as shown in D'Errico U.S. Pat. No. 3,176,823, Hartmeister U.S. Pat. No. 3,261,281, and Sirvet et al. U.S. Pat. No. 3,766,851. In order to effect transfer of decorated containers from the rotatable transfer wheel of a decorator apparatus to a deco chain, it also has been conventional practice for many years to utilize a construction and arrangement such that the pins are gradually telescopically inserted into the containers, prior to effecting transfer of the containers onto the pins, by the simple expedient of causing relative axial displacement between the containers and the pins during conveyance between the rotatable transfer wheel and the deco chain as illustrated by the aforementioned patents.

In the prior art, the rotatable transfer wheel apparatus has been of relatively complicated, expensive, heavyweight and large size construction to effect the required relationships of the containers relative to and between the rotatable mandrel wheel and the deco chain and to effect the transfer of the containers therebetween. In addition, such prior art apparatus has not generally permitted the most effective use of available space and the most effective location and arrangement of the conventional apparatus. In addition, the construction and arrangement of prior art apparatus has been such as to require operation of the deco chain and the transfer apparatus at different speeds to effect association and transfer of the containers relative to the deco chain pins.

In general, the present invention enables the elimination of the rotatable transfer wheel by the use of a continuously moving continuous loop lightweight inexpensive conveyor belt for conveying the containers directly from the rotatable mandrel wheel and for transferring the containers to the pins on the deco chain. The conveyor belt means comprises a belt member mounted on and driven by relatively simple inexpensive lightweight apparatus, enabling the mounting of the belt member in various positions relative to and between the rotatable mandrel wheel and the deco chain so that the belt member and deco chain may be variously located in the most advantageous positions relative to the decorator apparatus and curing oven and each other for any particular set of circumstances found in any particular container manufacturing facility. For example, the belt member may be mounted in a generally vertically extending attitude to effect transfer of containers to the chain above or below the rotatable mandrel wheel, or it may be mounted in a generally horizontally extending attitude to effect transfer horizontally outwardly of the rotatable mandrel wheel, or it may have any desired combination thereof. The belt member also enables the use of fixedly mounted nonmovable container carrying means, in the form of suction cup devices, and belt driving and timing means in the form of nut devices by which the suction cup devices are attached to the belt. The belt and the chain are synchronously driven by utilizing belt drive apparatus driven directly by the chain drive apparatus. Relatively simple, low cost, low maintenance, lightweight belt drive and guide wheel devices are enabled by use of the nut devices as the belt driving and timing means. Accurately timed positive holding and release of the containers is achieved, without use of any moving parts other than the belt and the suction cup devices affixed thereto, by providing a lightweight, inexpensive, substantially maintenance-free, container-holding vacuum connection means and container-releasing vacuum disconnecting means in the form of an elongated vacuum plenum extending between the rotatable mandrel wheel and the deco chain with a belt guide plate on one side having an elongated continuous vacuum slot therein connected to continuous elongated guide groove means in which the nut devices are slidably guidably received. The nut devices are hollow so as to connect the vacuum cup devices to vacuum throughout the length of the vacuum slot for the purpose of holding the containers on the belt member during conveyance of the containers and so as to automatically disconnect the vacuum devices from the vacuum slot adjacent the deco chain at the desired location and time of transfer of the containers from the belt member to the deco chain with the connection to vacuum being automatically re-established upon re-entry of the nut devices into the guide groove means just prior to transfer of the containers from the rotatable mandrel wheel to the suction cup devices by pressurized air propulsion, causing the containers to be blown off the mandrels onto the suction cup devices. In order to better drive the belt, additional solid center drive nut devices are fixedly mounted on the belt member in alternating spaced relationship to the suction cup nut devices, the construction and arrangement being such that at least one nut device is always in the end portions of the guide groove means to prevent the loss of effective vacuum in the end portions of the vacuum slot means which terminate closely adjacent the end portions of the guide groove means. The intermediate portions of the vacuum slot means are sealed by the adjacent side surfaces of the belt member which continuously effectively sealably engages laterally outwardly extending surfaces on each side of the guide groove means.

THE DRAWING

FIG. 2 is a schematic end view of a portion of the apparatus of FIG. 1;

FIG. 3 is a schematic plan view of a portion of the apparatus of FIGS. 1–2;

Figure 4:
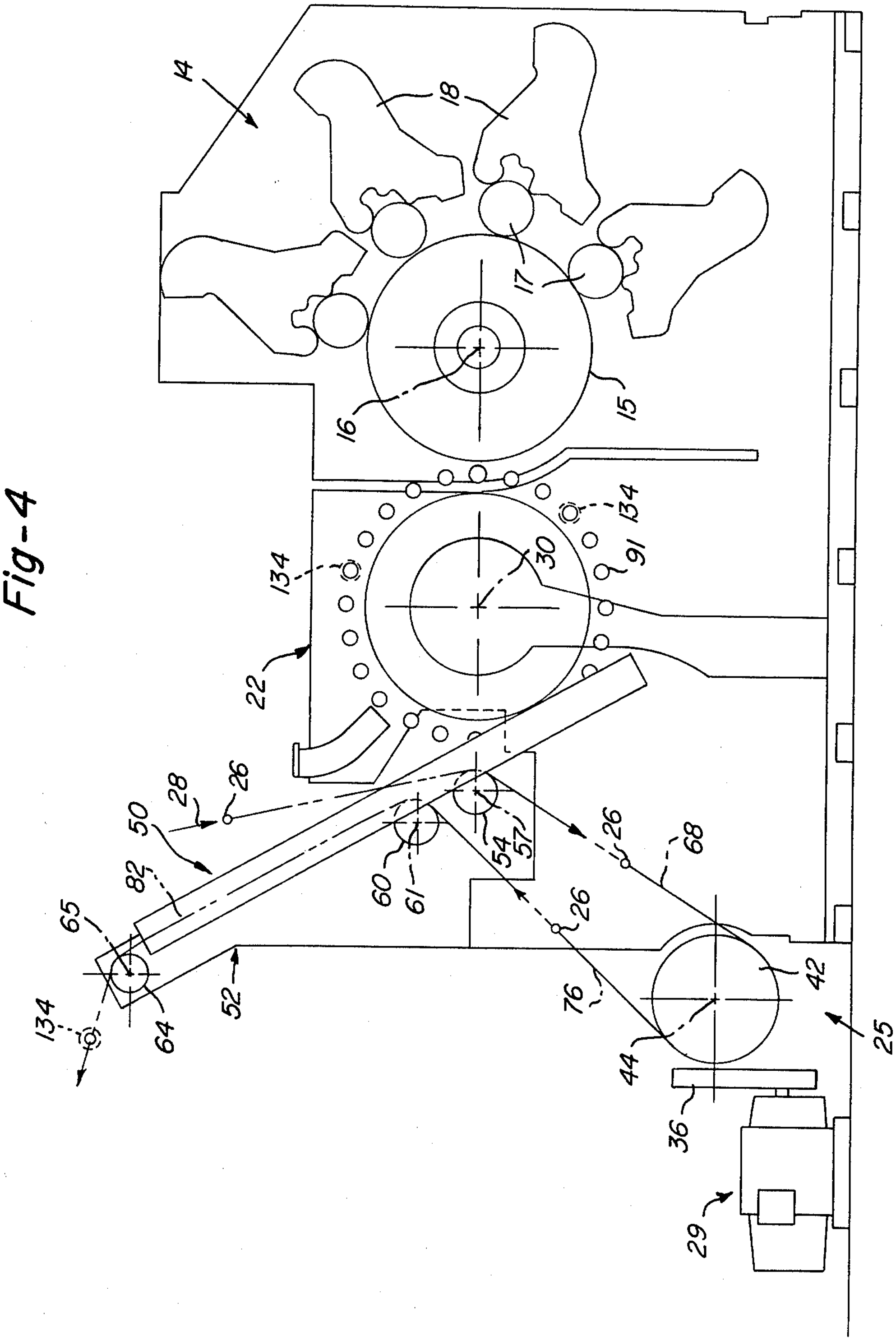
FIG. 4 is a schematic side elevational view of the apparatus of the present invention, illustrating a presently preferred arrangement and relationship among a rearranged conventional deco chain means, a new container conveyor belt means, and the conventional rotatable mandrel means of FIGS. 1–3.
Figure 5:
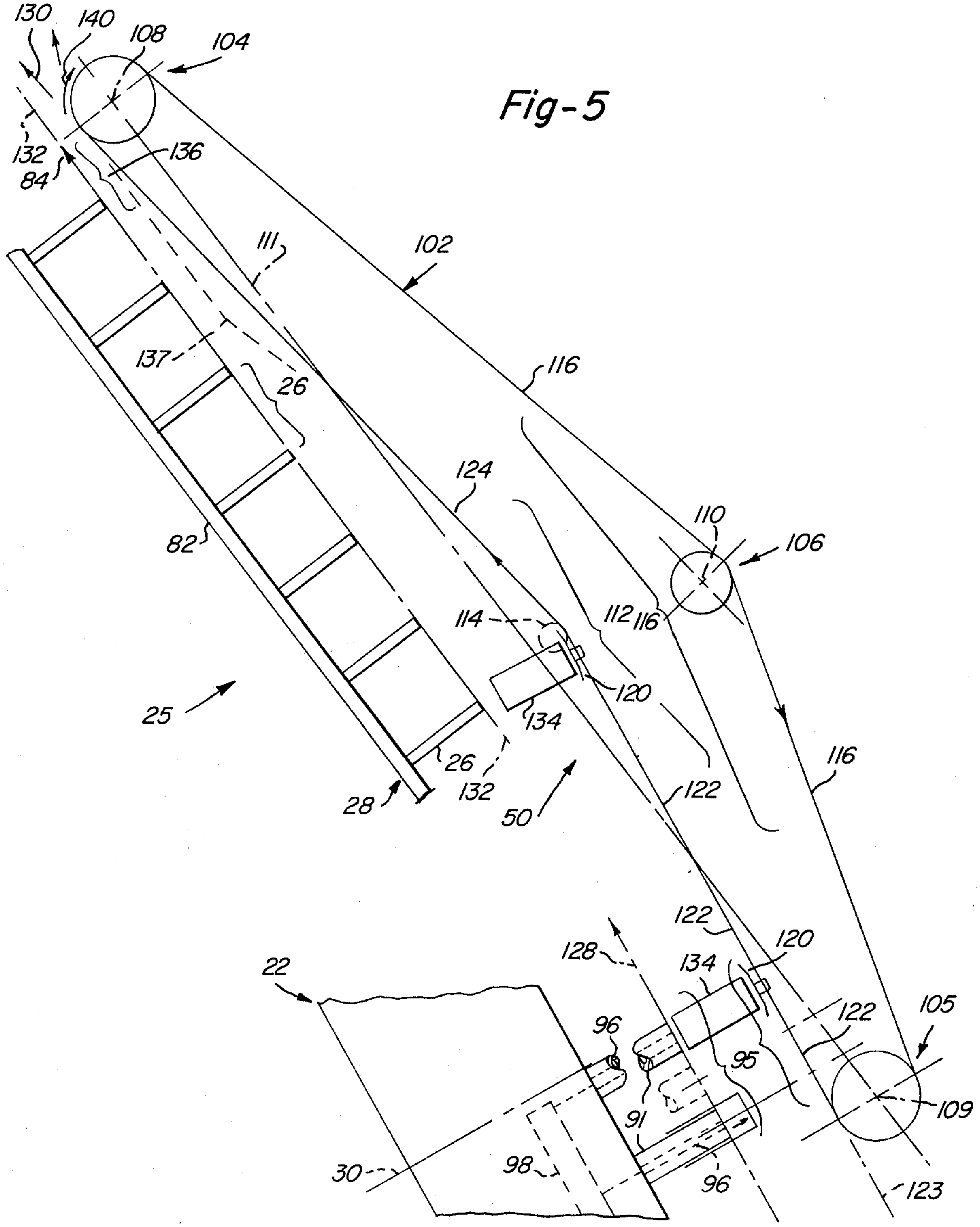

FIG. *4a* is an enlarged schematic side elevational view of a portion of the apparatus of FIG. 4;

FIG. 5 is a schematic side elevational view of the apparatus of FIG. 4 taken in the direction of the arrow 5 in FIG. *4a;*

FIGS. *6a & 6b* are an enlarged, partially schematic side elevational view of the belt means apparatus;

FIGS. *7a & 7b* are an enlarged cross-sectional view of belt guide and support means taken along line 7—7 in FIG. *6b;*

Figure 8:
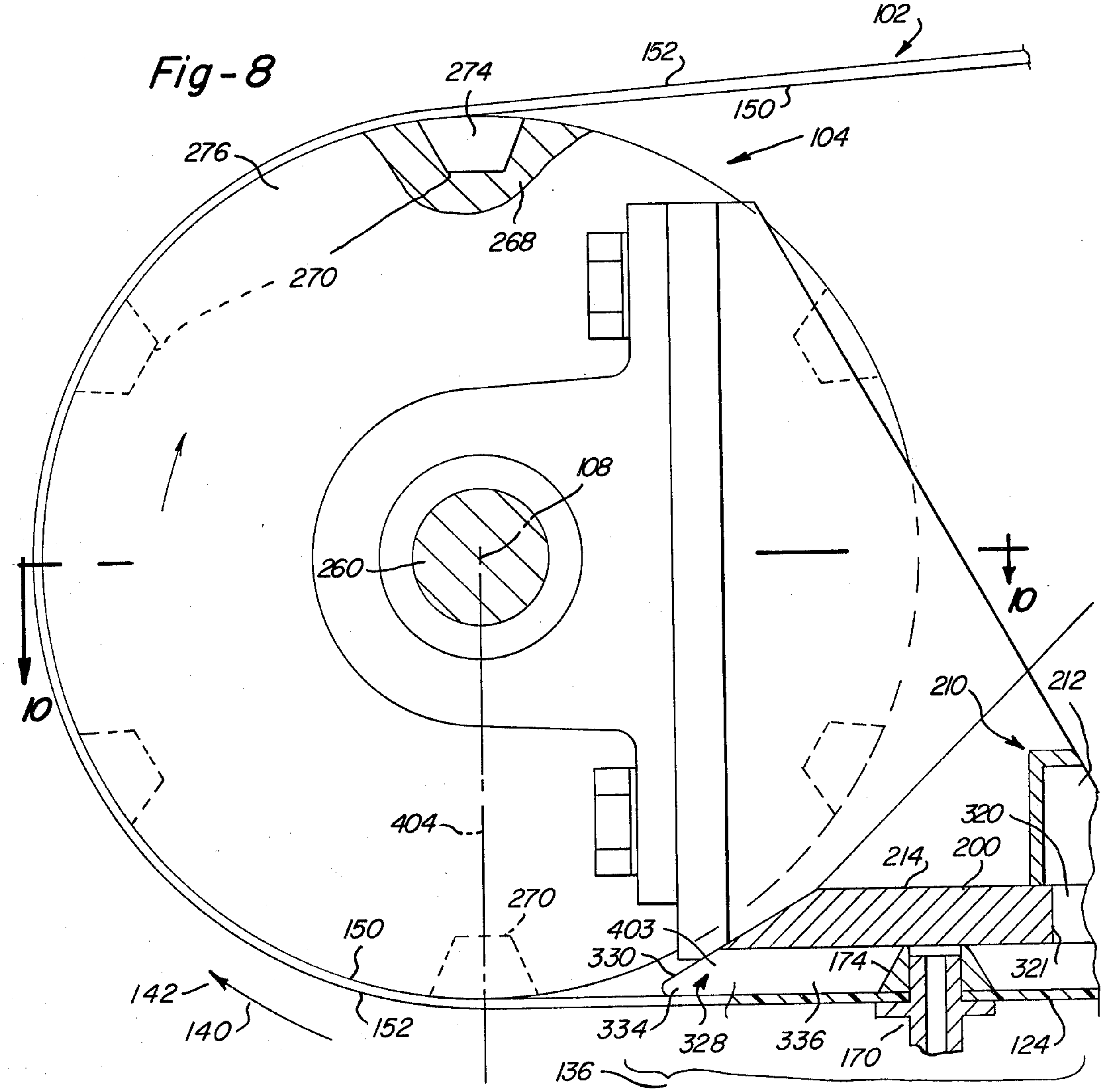

FIG. 8 is an enlarged partial cross-sectional side elevational view of a belt drive means schematically illustrated in FIG. *6a;*

Figure 9:
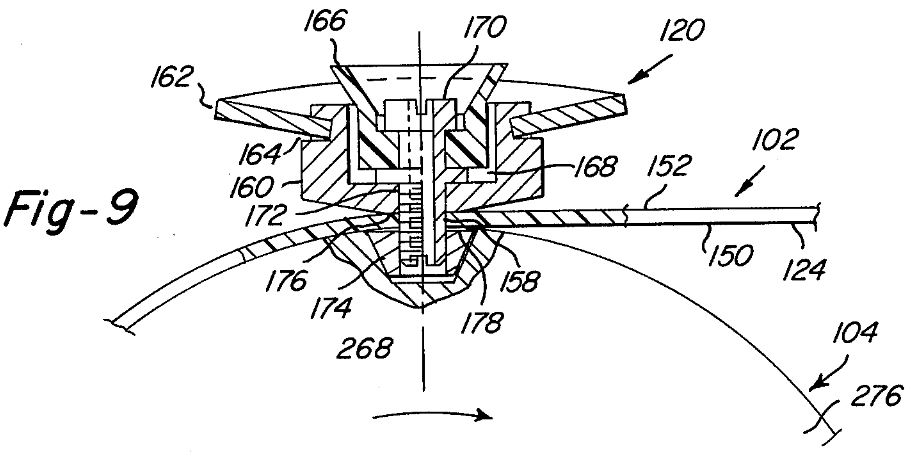
Figure 10:
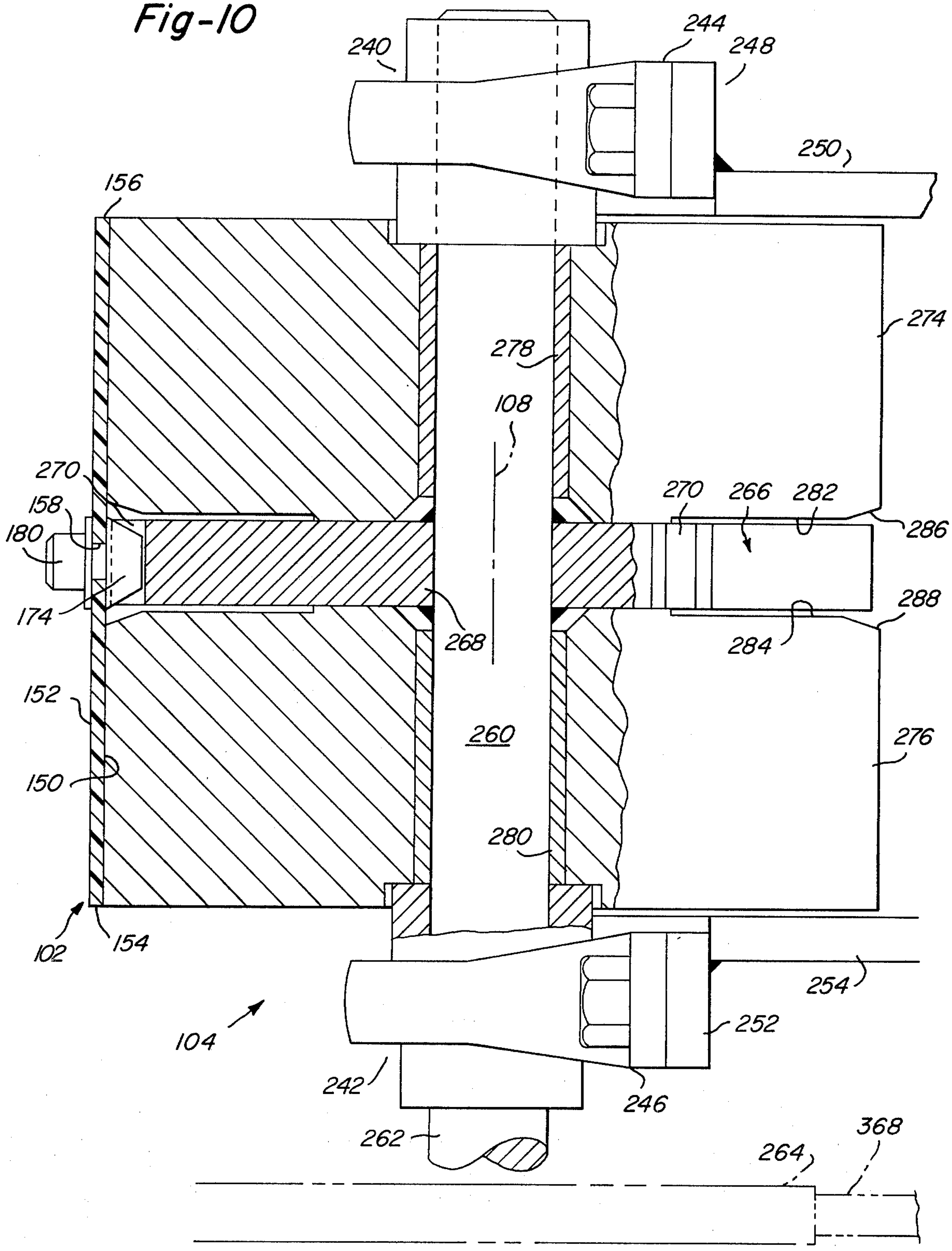
Figure 11:
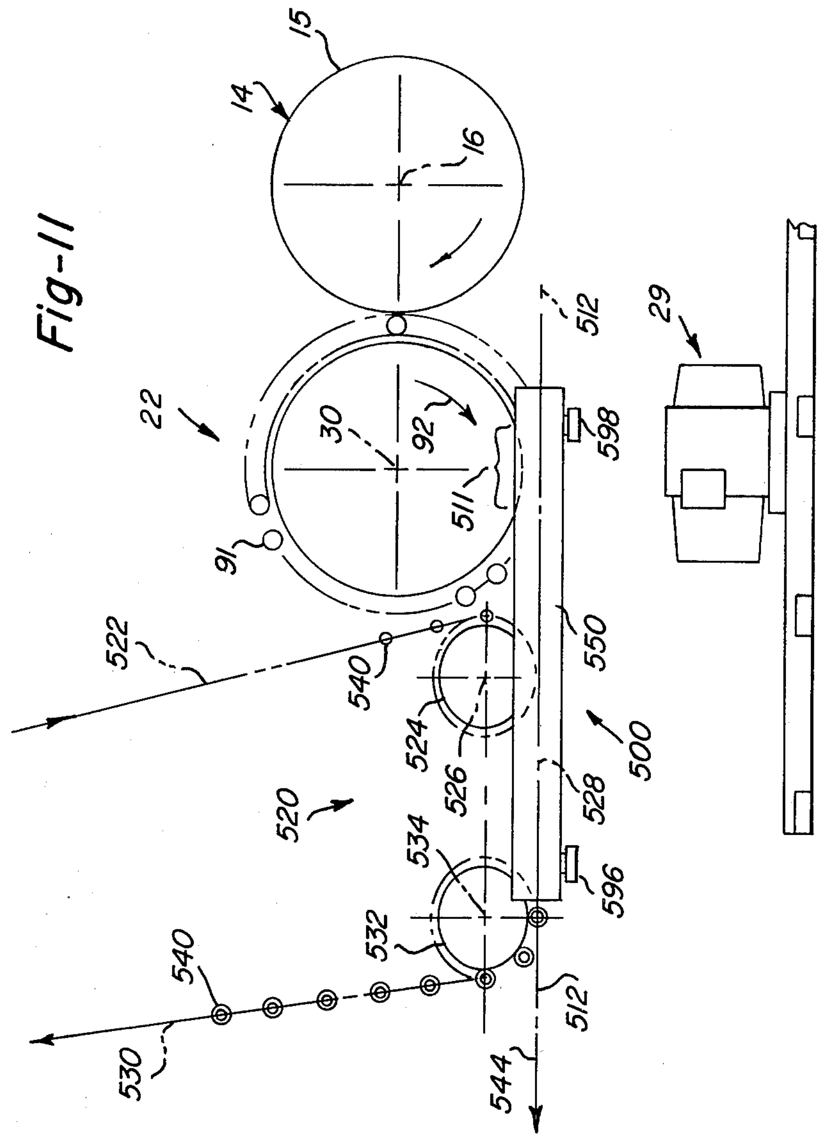
Figure 12:
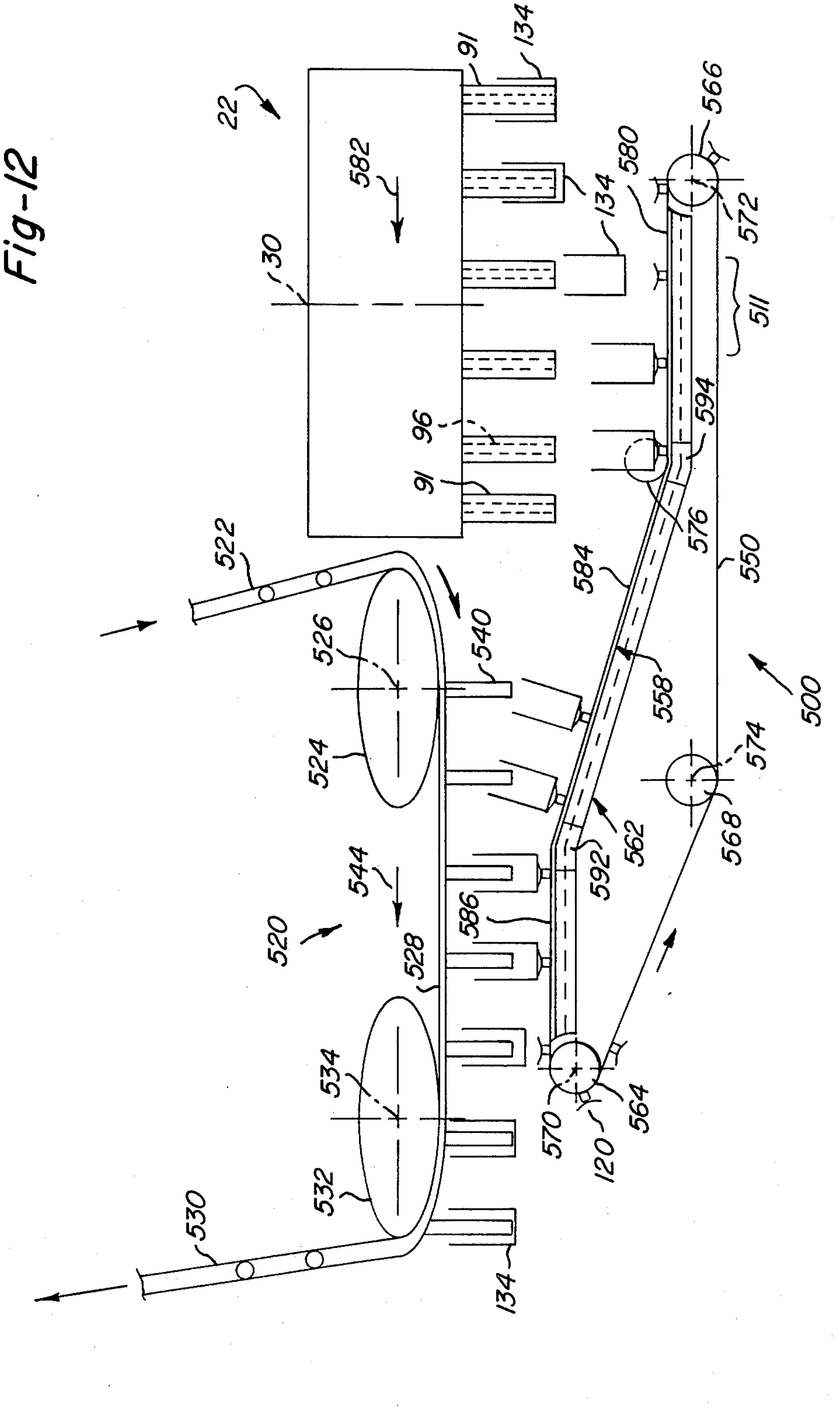

FIG. 9 is an enlarged cross-sectional view of a vacuum cup assembly as mounted on a belt member and associated with the belt drive means; and FIG. 10 is an enlarged partial cross-sectional side elevational view of the apparatus of FIG. 8;

FIG. 11 is a schematic partial side elevational view of an alternative arrangement of the apparatus of the present invention; and FIG. 12 is a schematic plan view of the apparatus of FIG. 11.

IN GENERAL

Figure 1:
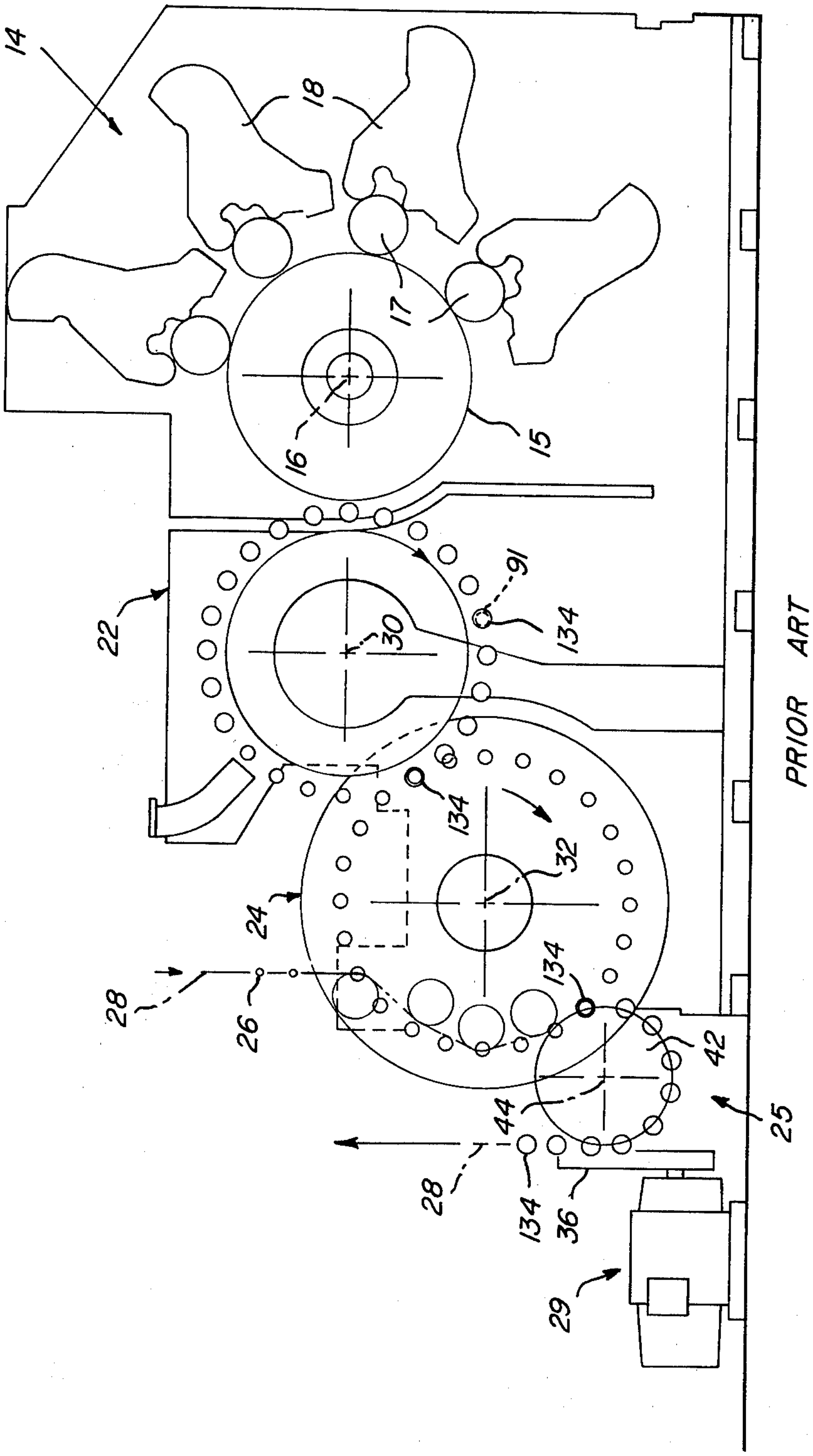
Fig-1 PRIOR ART
FIG. 1 is a schematic side elevational view of a conventional arrangement of a conventional container decorator system.

While it is contemplated that the inventive concepts may be used for conveying various articles in conjunction with various kinds of apparatus, the apparatus of the present invention is particularly adapted for use in conveying containers and, more particularly, is adapted for use in improvement of a conventional container decorating system, FIGS. 1–3, comprising: a conventional ink applicator means 14 including a blanket wheel means 15 rotatable about a horizontal axis of rotation 16 in engagement with plate cylinders 17 associated with ink application apparatus 18; a conventional continuously rotatable container carrying mandrel wheel means 22 for carrying containers to be decorated into engagement with the blanket wheel means 15 to decorate the containers by application of ink images to the outer peripheral surface thereof; a conventional continuously rotatable decorated container transfer wheel means 24 for receiving decorated containers from the container mandrel wheel means 22 and for transferring the decorated containers to chain conveyor means 25 having spaced pin members 26 carried by a continuous inclined deco chain member 28; and motor means 29 for driving the aforedescribed apparatus by suitable connecting means (not shown). The rotatable mandrel wheel means 22 and the transfer wheel means 24 are ordinarily rotatable about vertically and horizontally spaced parallel horizontal axes 30, 32. The chain conveyor means 25 is driven by the motor means 29 through a transmission belt means 36, a speed reduction gear means 38, and a chain drive sprocket wheel 42, having an axis of rotation 44, mounted on a generally vertically upwardly inclined extending chain support frame assembly 45. The chain member 28, support frame assembly 45, and chain drive sprocket wheel 42 are inclined relative to a vertical plane 46, as has been conventional for many years as illustrated by Hartmeister U.S. Pat. No. 3,261,281 and D'Errico U.S. Pat. No. 3,176,823, so that rotational axis 44 and the pin members 26 are inclined relative to a horizontal plane 47 at an angle of approximately 7° to 10°, and the paths of movement of the chain drive sprocket wheel 42, the pin members 26, and chain member 28 are inclined relative to a vertical plane at a corresponding angle for the purpose of preventing the decorated containers from falling off the pin members 26 during transfer to an ink curing - drying oven (not shown).

As illustrated in FIGS. 4–5, the present invention involves replacement of transfer wheel means 24 of the conventional decorator system of FIGS. 1–3 with a belt conveyor means 50 mounted between the conventional mandrel wheel means 22 and conventional the chain conveyor means 25 on a support plate means 52, which is suitably fixedly mounted in parallel inclined relationship on the conventional support plate 52, with modifications of the location and arrangement of the conveyor chain apparatus as hereinafter described. In the illustrative arrangement, the central longitudinal axis 51 of belt means 50 is vertically upwardly outwardly inclined relative to the mandrel wheel means 22.

DECO CHAIN CONVEYOR MEANS

In the illustrative embodiment of FIGS. 4–10, the conventional construction and location of the deco chain drive sprocket wheel member 42, which is inclined at an angle of 10° relative to a vertical plane, is not changed but the path of travel of the chain member 28 is changed in the following manner. A first downward chain movement controlling idler chain sprocket wheel member 54 is mounted on support plate 52 above the drive sprocket wheel member 42 in generally circumferentially tangent juxtaposition to the outer periphery 56 of the mandrel wheel means 22 with its axis of rotation 57 correspondingly inclined at an angle of 10° relative to and intersecting a horizontal plane 58, including the axis of rotation 30 of the mandrel wheel means 22. A second upward chain movement controlling idler chain sprocket wheel member 60 is mounted above and laterally upwardly outwardly offset from and in juxtaposition to the first idler chain sprocket wheel member 54 with its axis of rotation 61 correspondingly inclined at an angle of 10°. A plane 62, including the axes of rotation 57, 61 of sprocket wheel members 52 & 60 extends generally tangentially relative to the periphery 56 of mandrel wheel means 22 at a point 64 located approximately 30° below plane 58. A third upward chain movement controlling sprocket wheel member 64, having a 10° inclined axis of rotation 65 coplanar with plane 62, is mounted above and laterally outwardly offset from the second idler chain sprocket wheel member 60. The chain member 28 includes a first lowermost portion 68, extending between lowermost first idler sprocket wheel 54 and drive sprocket wheel 42, which moves downwardly and outwardly relative to the mandrel wheel means 22 in the direction of arrow 70 with a straight line path of movement lying in a plane 72 intersecting a vertical plane 74 including rotational axis 44 at an angle of approximately 30°. A second lower chain portion 76, extending between drive sprocket 42 and the second idler sprocket wheel 60, moves upwardly and inwardly relative to the mandrel wheel means 22 in the direction of arrow 78 with a straight line path of movement lying in a plane intersecting vertical plane 74 at an angle of about 45°. An intermediate chain portion 82 extending between the upper and lower idler chain sprocket wheels 60, 64, moves upwardly and outwardly relative to mandrel wheel means 22 in the direction of arrow 84 with a straight line path of movement in a plane 86, extending transversely to belt means 50 and including the central longitudinal axis 51 thereof, which intersects a vertical plane 88 at an angle of about 30°.

MANDREL WHEEL MEANS

Figure 4A:
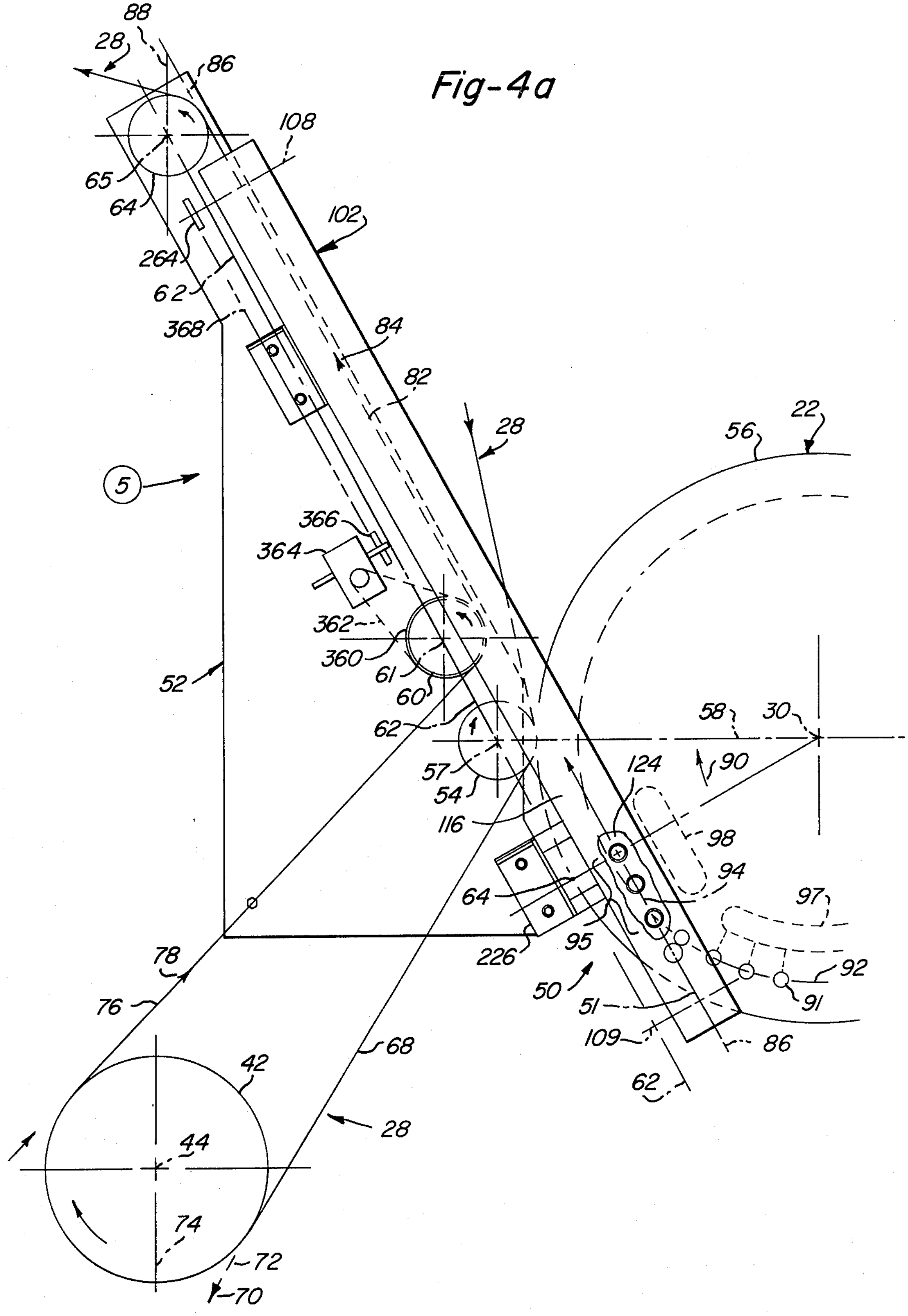

The container mandrel wheel means 22, which is rotatably movable along a rotational path in a vertical plane in the direction of the arrow 90, carries a plurality of circumferentially spaced container carrying mandrels 91, which extend horizontally parallel to the axis of rotation 30 and carrying decorated containers from the ink applicator means 14 along an arcuate path 92. Conventional cam means (not shown) are provided to change the arcuate path of movement 92 to a generally straight line path of movement 94 during a portion of the movement along a transfer zone 95 including about 15° of the circumferential movement. As shown in FIG. 4*a*, the straight line path of movement 94 of the mandrel 91 is located in plane 86 in the container transfer zone 95. As shown in FIGS. 4*a* & 5 vacuum and air passage means 96 in the mandrels 91 are connected to vacuum source means 97 to hold the container members on the mandrels during movement to the transfer zone 95 whereat the vacuum is terminated, and are connected to pressurized air source means 98 in the transfer zone to blow the containers off the mandrels to effect transfer to the belt conveyor means 50.

CONTAINER CONVEYOR BELT MEANS

As shown in FIG. 5, the container conveyor belt means 50 comprises a continuously movable continuous loop belt member 102 movably supported by an uppermost timing and drive wheel means 104, for driving the belt member in fixed synchronized timed relationship relative to the mandrel wheel means 22 and the deco chain means 25, and by lowermost and intermediate idler wheel means 105, 106 for guidably supporting the belt member. The belt member is mounted in laterally offset juxtaposition to the mandrel wheel means 22 for receiving decorated containers from the mandrel wheel means and in laterally offset juxtaposition to the pins 26 on deco chain portion 82 for conveying the containers to and telescopically associating the containers with the deco chain pin members 26. The wheel means 104, 105, 106 are rotatable about vertically and laterally spaced parallel generally horizontally extending axes of rotation 108, 109, 110 which intersect horizontal and vertical planes 58, 88 at angles of about 30° and 60°, respectively, as illustrated in FIG. 4*a*. The axes of rotation 108, 109 lie in a plane 111 substantially parallel to the path of movement 84 of the deco chain portion 82 so as to be inclined relative to a vertical plane at a corresponding angle of approximately 10°.

As shown in FIG. 5, the belt member 102 comprises a generally vertically upwardly moving half loop portion 112, which extends between wheel means 104, 105 and is guidably supported and positioned by intermediate roller means 114, and a laterally outwardly spaced generally vertically downwardly moving half loop portion 116, which extends between wheel means 104, 105 and is guidably supported and positioned by intermediate idler wheel means 110. A plurality of container gripping and carrying suction cup means in the form of the devices 120 are centrally mounted on the belt member in uniformly longitudinally spaced relationship there along so as to be located in the longitudinal central plane 51 of the belt member, in equally spaced relationship to the deco chain pin members 26, for holding containers thereon during movement from the mandrel wheel means 22 to the deco chain pin members 26 and for releasing the containers after telescopic association with the deco chain pin members as will be hereinafter described. The upwardly moving half loop portion 112 of belt member includes a vertically extending portion 122, extending between idler wheel means 105 and guide roller means 114 with a vertical path of movement in a vertical plane 123 extending at an angle of approximately 7° relative to and away from the vertically inclined plane of the path of movement 84 of the deco chain portion 82, and further includes an uppermost vertically inclined portion 124 extending between guide roller means 114 and drivewheel means 104 at an angle of approximately 7° relative to and toward the inclined plane of the path of movement 84 of the deco chain portion 82.

As shown in FIG. 5, the construction and arrangement of the lower portion 122 of the belt member 102 relative to the mandrel wheel means 22 is such that the vertical plane 123 of the path movement of the belt portion 122 is parallel to the vertical plane 128 of the rotational path of movement 92 of the container supporting mandrels 91 throughout the transfer zone 95 whereat the decorated container are blown into the suction cups 120 by pressurized air in a conventional manner and held thereon by vacuum in a manner and by apparatus to be hereinafter described. The construction and arrangement of the upper portion 124 of the belt member relative to the deco chain 28 is such that the vertically inclined plane 130 of the linear path of movement of belt portion 124 intersects the 10° vertically inclined plane 132 of the linear path of movement 84 of the chain portion 82 at an angle of about 7° whereby the container members 134 carried by the suction cup devices 120 are gradually telescopically associated with the pin members 26 prior to transfer of the containers to the pin members by loss of vacuum applied to the suction cups at or next adjacent the drive wheel means 104 along a relatively short length transfer zone 136, FIG. 8. In this manner, the container members are substantially fully telescopically positioned relative to the chain pin members 26 before being released from the vacuum cup devices 120 and, as the containers fall onto the pin members by gravity, the suction cup devices 120 are immediately moved away from the container members along an arcuate path of movement 140, FIG. 6*a*, which is of rapidly increasing divergency from the path of movement 84 of the chain portion 82. As illustrated by the broken line 137 in FIG. 5, the direction of movement of the uppermost part of belt portion 124, next adjacent the drive wheel means 104, may be changed by suitable guide plate means (not shown) so as to be parallel with the path of movement 84 of the chain portion 82, 28 at the time of transfer of the containers to the pins, as further illustrated in the alternative embodiment of FIGS. 11 and 12, thereby reducing possible interference between the containers and the suction cup devices during transfer and movement onto and around the drive wheel means.

Referring to FIGS. 7-10, the belt member 102 is made of conventional high strength lightweight substantially air impervious material such as Nylon fibre which may be suitably coated. It has a rectangular cross section defined by opposite relatively closely spaced parallel inner and outer side surfaces 150, 152 and relatively widely spaced edge surfaces 154, 156. The suction cup devices 120 are fixedly mounted on the belt member in uniformly spaced mounting holes 158 located along the central longitudinal axis of the belt member. As shown in FIG. 9, each suction cup device 120 comprises an annular support member 160 mounting a deflectable ring member 162 in an annular outer groove 164 and a flexible resilient vacuum cup member 166 in an inner annular counter bore 168. A hollow threaded bolt type fastener member 170 extends through a central bore 172 in member 160 and through a belt mounting hole 158 with a threaded end portion receiving a threaded fastening nut member 174 of frusto-conical shape providing belt drive and guide means. In the assembled position, opposite flat annular surfaces 176, 178 of members 160, 174 securely grippingly engage the side surfaces 150, 152 of the belt member circumjacent the hole 158 to enable transfer of force therebetween sufficient to drive the belt member while also sealing the hole 158. Additional belt drive and guide means 180, FIGS. 7 & 10 in the form of a solid bolt member 182 and a frusto-conical fastening nut member 174, are mounted in holes 158 in alternate staggered colinear relationship to the suction cup devices 120.

Figure 6A:
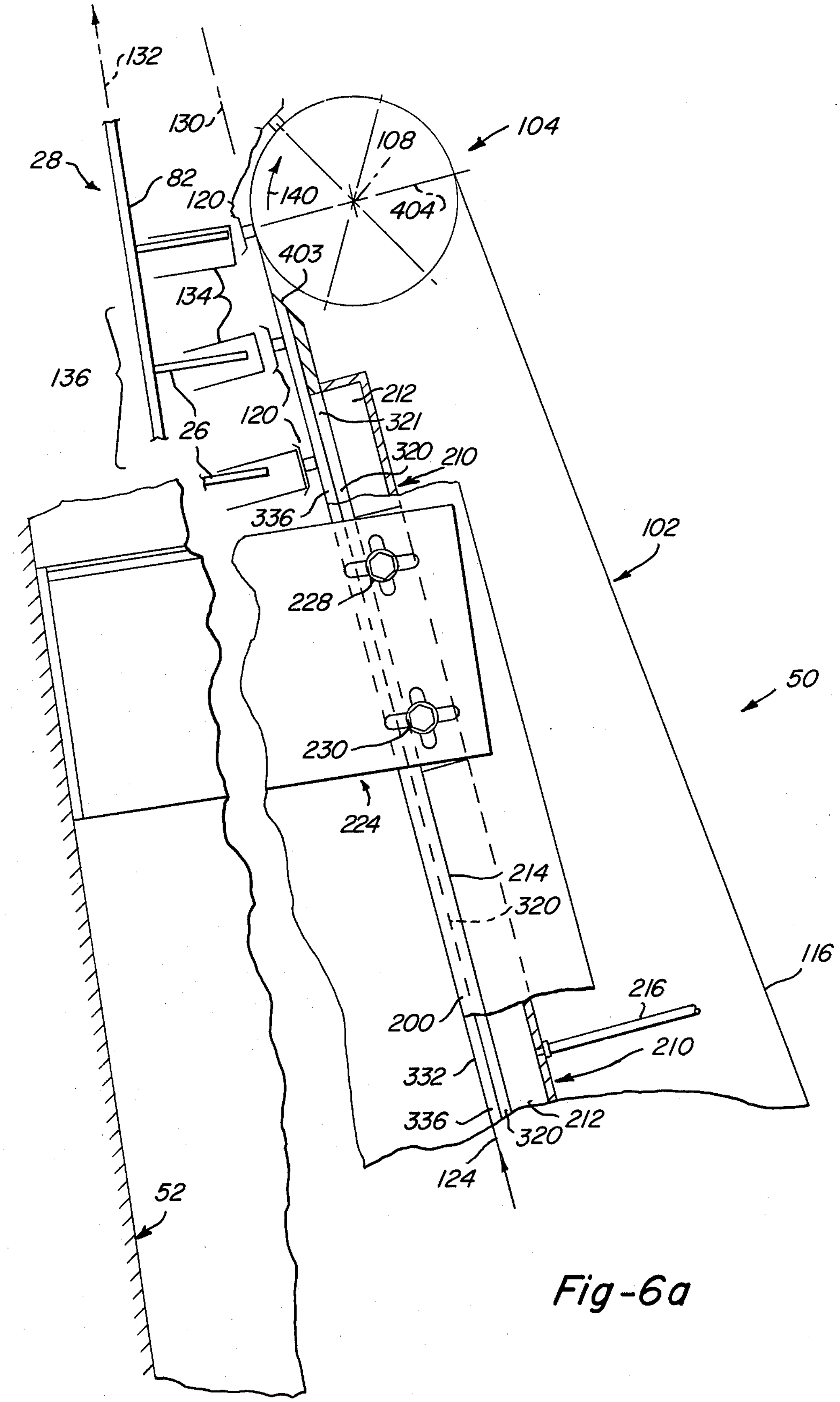
Figure 6B:
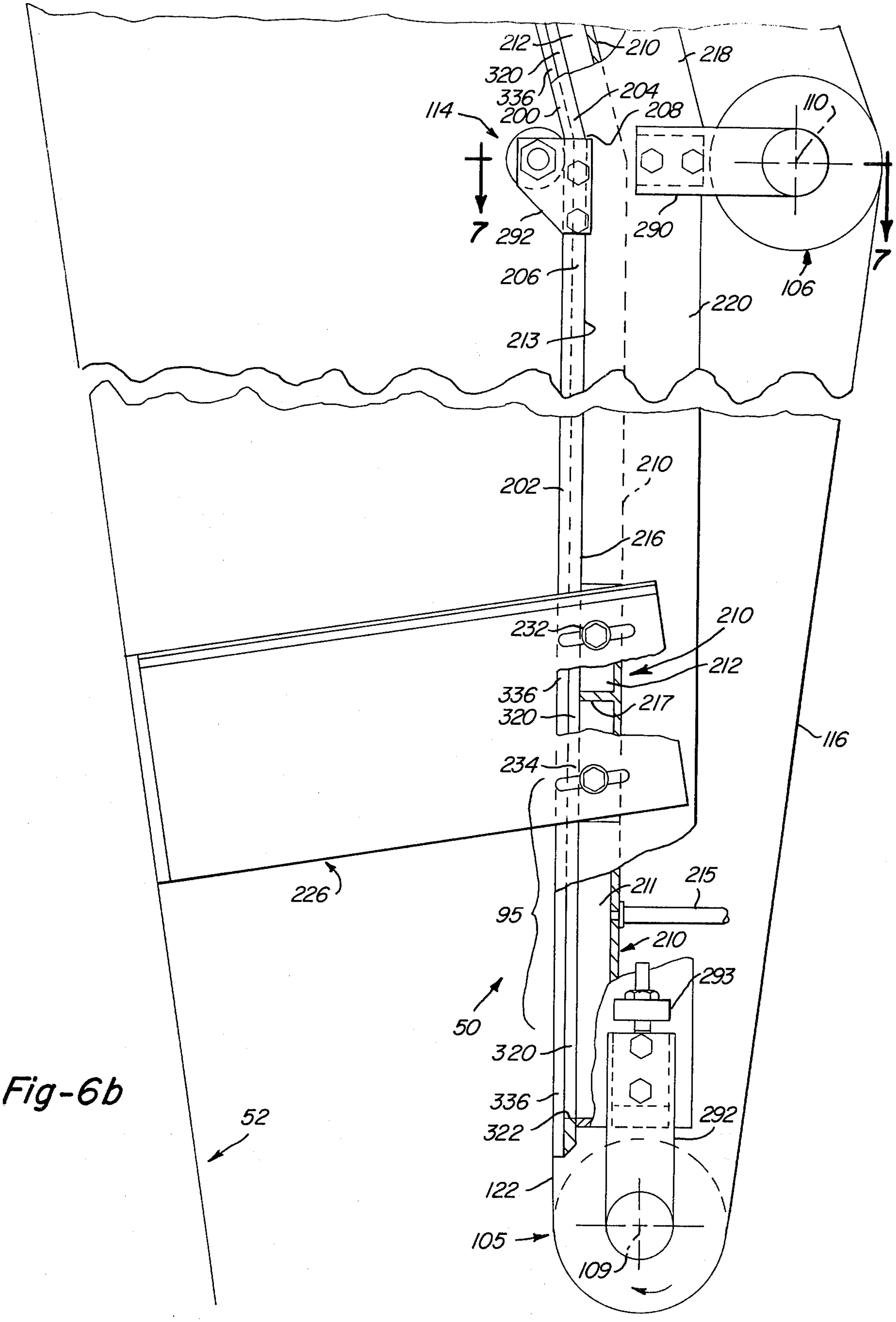
Figure 7A:
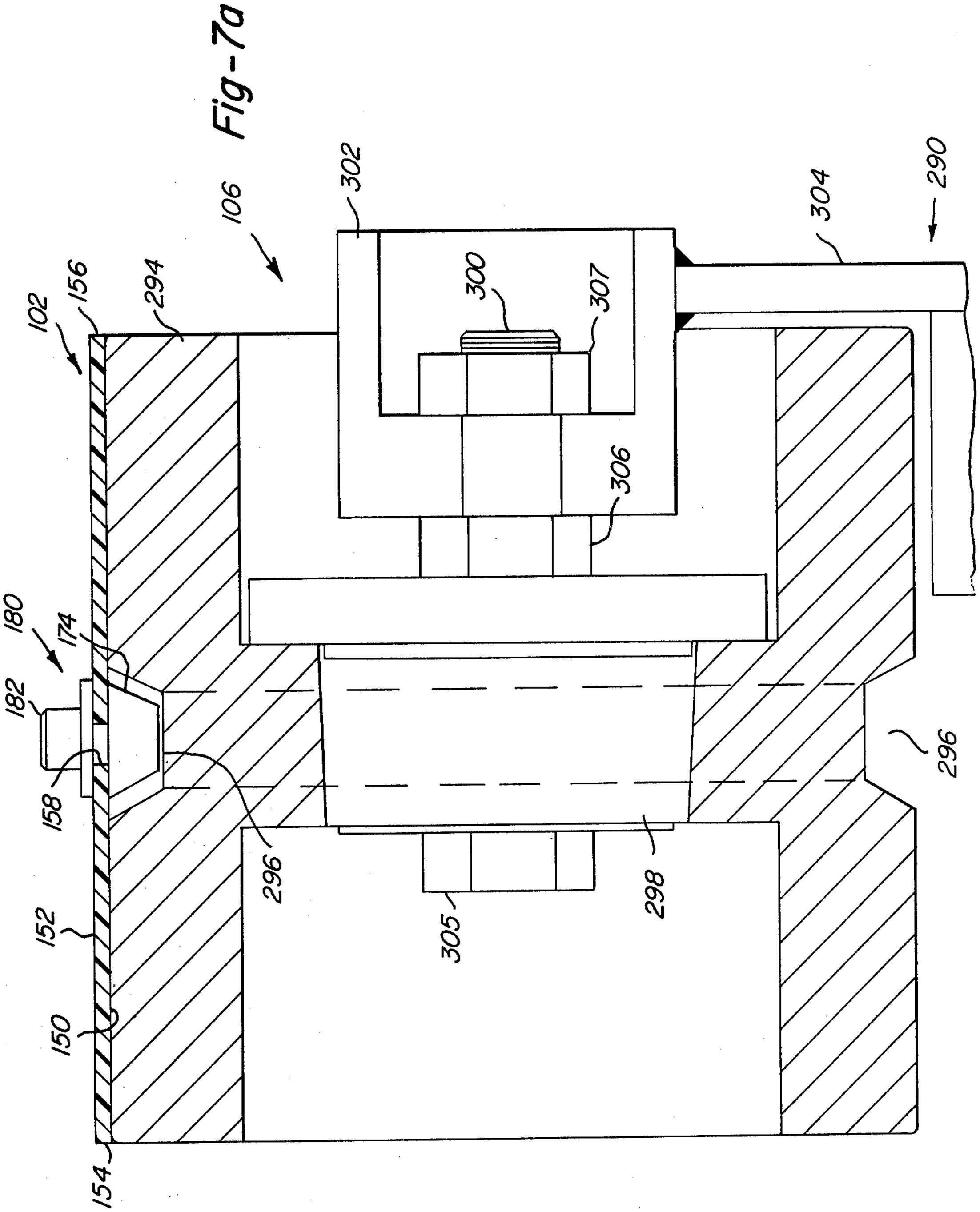
Figure 7B:
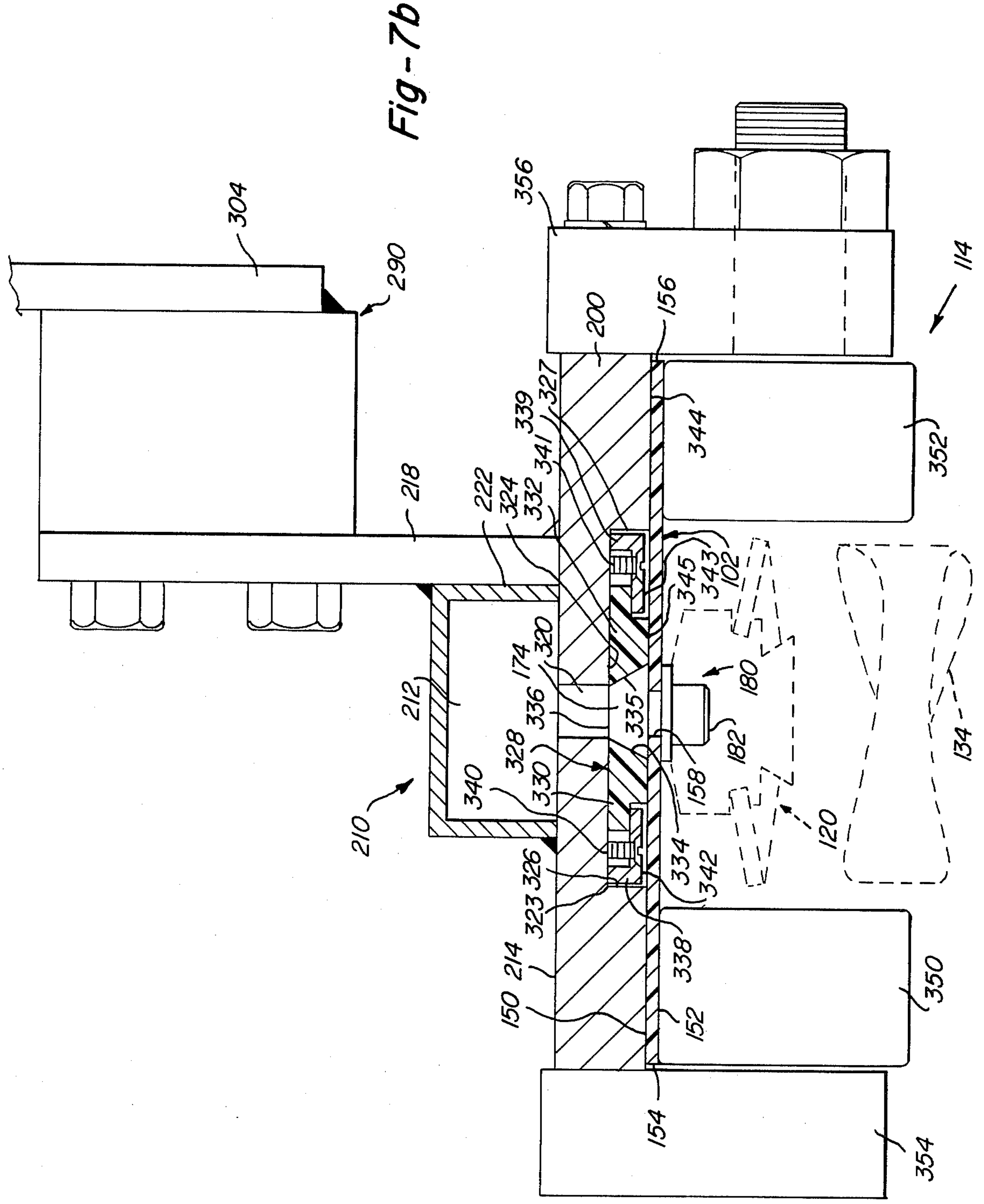

Referring now to FIGS. 6, 7*b* and 8, the belt transfer means further comprises elongated belt guide and support means in the form of plate members 200, 202 of generally rectangular cross sectional configuration, FIG. 7*b*, having abutting end portions 204, 206, FIG. 6*b*, suitably fixedly secured relative to one another at 208 and extending in fixed inclined intersecting relationship to one another. As shown in FIG. 7*b*, an elongated continuous vacuum housing means 210, having first and second elongated continuous vacuum chamber means 211, 212, is centrally mounted on the inner side surfaces 213, 214 of plate members 200, 202 for connection to a conventional vacuum source (not shown) through vacuum connection means 215, 216 separated by a baffle or wall means 217, FIG. 6*b*, to supply vacuum to the vacuum cups in a manner to be hereinafter described. The vacuum chamber means 211 is of relatively short length to provide maximum vacuum conditions in the transfer zone 95 whereat the containers are blown onto the vacuum cup devices 120, the vacuum in chamber means 212 being less critical during conveyance of the containers after vacuum holding engagement with the vacuum cup devices. Mounting plate members 218, 220 are fixedly mounted on the plate members 200, 202 in abutting engagement with side surfaces 222 of the vacuum housing means 210. A pair of support bracket assemblies 224, 226 are suitably fixedly secured at one end to the inclined mounting plate 52 and adjustably attached to the plate members 218, 220 at the other end by suitable slots and fastening means 228, 230, 232, 234. The various plate members 200, 212, 210, 218, 220 are preferably made of a lightweight metallic material such as aluminum.

As shown in FIG. 10, drive roller means 104 is rotatably supported on the upper end of the support plate assembly by conventional pillow block bearing assemblies 240, 242 adjustably fixedly secured to plate member 200 by bracket members 244, 246 and plate members 248, 250 & 252, 254 which are also preferably made of a light weight material such as aluminum.

The drive roller means 104 comprises a drive shaft member 260 rotatably mounted in the pillow block bearing assemblies with one end portion 262 extending laterally outwardly to enable mounting of a drive chain sprocket 264 thereon. A belt drive wheel means 266 is fixedly mounted on shaft 260 for rotation therewith and comprises an annular sprocket-like wheel member 268 having a relatively large diameter and a relatively narrow width which is slightly larger than the diameter of the nut members 174. A plurality of equally circumferentially spaced tapered grooves 270, having a depth greater than the height and a taper corresponding to the frusto-conical nuts 174 are provided along the outer periphery of the wheel member 268. The number, size and spacing of grooves 270 is such as to receive the belt nuts 174 and drive the belt in uniform controlled speed relative to the deco chain 28. A pair of relatively wide idler roller members 274, 276 made of lightweight aluminum material are mounted on shaft member 260 on opposite sides of drive wheel 268 by bearing sleeve members 278, 280 and have offset inner side surfaces 282, 284 and tapered surfaces 286, 288 to accomodate slight laterally movement of the belt. The width of roller members 274, 276 is such as to fully support the width of the belt member during movement therearound.

Belt guide idler roller means 106, 114 made of lightweight aluminum material, are adjustably mounted on mounting plate members 218, 220 by suitable plate assemblies 290, 292, FIG. 6*b*, of lightweight aluminum material, which may be provided with suitable adjustment means 293. As illustrated in FIG. 7*a*, each idler roller means 105, 106 comprises an annular rim portion 294 having a central tapered annular groove 296 adapted to freely longitudinally slidably accommodate the nuts 174 during movement of the belt thereabout while suitably limiting lateral movement thereof. The roller members are rotatably mounted on conventional bearing units 298 suitably mounted on a shaft 300 supported in a hub member 302 on a support plate 304 by suitable fastening devices 305, 306, 307.

As shown in FIGS. 6-8 each of the belt guide and support plate members 200, 202 has an elongated continuous relatively narrow width vacuum slot means 320 extending along the central longitudinal axes of the plate members 200, 202 so as to be aligned with the nuts 174 on the belt member. The slot means 320 terminates at 321 & 322 respectively, adjacent the drive wheel means 104 and the idler wheel means 105. An elongated continuous relatively wide mounting slot 323, having a flat bottom surface 324 extending between spaced parallel side surfaces 326, 327, extends parallel to and coextensively with vacuum slot means 320. Bearing and guide plate means 328 are mounted in slots 323 for receiving, guiding and sealing the nuts 174 and portions of the inner belt surface 150 adjacent the nuts. In the presently preferred and illustrative embodiment, the plate means 328 comprises a pair of elongated strips 330, 332 of a relatively low coefficient of friction Nylon type plastic material each of which has a tapered inner side surface 334, 335 defining a portion of an elongated continuous nut receiving slot means 336 having a tapered cross section corresponding to the size and shape of the nuts 174. The strips 330, 332 are adjustably fastened in slot 322 by suitable fastening means such as spaced clamp members 338, 339 and threaded fastening devices 340, 341 constructed and arranged to be inwardly offset from the belt to provide a clearance gap, 342, 343 and to enable lateral adjustment of the strips as necessary or desirable. The distance between the bottom surface 324 of slot 323 and plate abutment surfaces 345 is preferably greater than the depth of slot 323 so that the belt abutment surfaces 345 are located outwardly beyond the belt engaging surfaces 344 of the support plates 200, 202.

In order to maintain contact between the inner belt surface 150 and the support plates 200, 202 and plate means surfaces 345 at the intersection 208, the guide wheel means 114 comprises cam follower type roller means 350, 352 adjustably rotatably mounted at the intersection by bracket members 354, 356 for continuous engagement with the outer portions of the belt member located beyond the mounting slot 323 with sufficient clearance to enable passage of the suction cup devices 120 and containers 134 as illustrated in phantom in FIG. 7*b*.

As shown in FIG. 4*a*, the belt drive system further comprises a sprocket wheel 360 operably connected to chain idler sprocket 60 and driven in synchronized times relationship thereby in direct response to the chain movement. A timing belt or chain 362 connects sprocket wheel 360 to a conventional transmission unit 364 which drives a sprocket wheel 366 connected to chain sprocket 264 on shaft 260 by a chain member 368.

As shown in FIGS. 6*a* & 8, in the presently preferred embodiment, there are six nut drive slots 270 on drive wheel 268 spaced at 60° intervals thereabout to alternately receive the nut members 174 of the vacuum cup devices 120 and the drive devices 180. The vacuum slot 320 terminates at a location 321 spaced from the end 403 of guide slot 336 a distance approximately equal to the pitch length between adjacent nut slots 270 so that there will be a guide nut 174 in slot 336 at all times to reduce vacuum loss from vacuum slot 320 through guide slot 336 next adjacent the drive wheel means 104.

In operation, the containers 134 are held on the suction cup devices 120 by vacuum supplied through vacuum slot means 320 until just prior to reaching the drive wheel means 104 at which time the chain pins 26 have been substantially fully located within the containers as illustrated in FIG. 6*a*. As the vacuum cup devices 120 move beyond the end 321 of the vacuum slot 320, residual vacuum is momentarily maintained in the vacuum cup devices and, in combination with container momentum, may slightly delay full release of the containers 134 from the vacuum cup devices 120 and full association of the containers with the chain pins 26 until approximately the time when the drive nuts 174 are fully seated in the drive slots 274, 270 at center line 404 whereat movement away from the chain pins 26 along the arc 140 in the direction of the arrow 142 is initiated. Thus, at about the time of completion of the transfer of the containers from the suction cup devices 120 to the chain pin members 26, the suction cup devices have a path of movement which is initially substantially parallel to and subsequently divergent from the path of movement of the chain pin members 26.

ALTERNATIVE EMBODIMENTS OF FIGS. 11–12

Referring to FIGS. 11–12, alternative embodiments of the invention are illustrated by a continuous loop continuously moving belt means 500 mounted in a horizontally extending attitude relative to the continuously rotatable mandrel wheel means 22 having a horizontal axis of rotation 30. As previously described, decorated containers 134 are carried the by the circumferentially spaced mandrel means 91 carried along the generally circular path 92 with the straight line transfer zone 511 relocated in a horizontally extending plane 512. A continuously moving inclined continuous deco chain means 520 has a vertically downwardly moving portion 522, extending around an inclined idler sprocket wheel 524 having an inclined axis of rotation 526, a horizontally extending portion 528, and a vertically upwardly moving portion 530 extending around an inclined drive sprocket wheel 532 having an inclined axis of rotation 534. Thus, the inclined pin members 540, are carried in transversely outwardly extending relationship to the deco chain, along a straight line horizontal path of movement in horizontal plane 512 by chain portion 528 between sprocket wheels 524, 523 in the direction of arrow 544. The drive motor means 29 is relocated closer to the mandrel wheel means 22 and suitably drivably connected to chain drive sprocket 532 and the mandrel wheel means and the blanket wheel means 15 in a conventional manner.

The belt means 500, which is of the same general construction as the prior described belt means 50, comprises a belt member 550 and suction cup devices 120 fixed on the belt member by the previously described frustro-conical hollow nut members 174, which are received in the previously described guide groove means 336 in plate means 558 having the previously described vacuum slot means 320 connected to vacuum chamber means 562 as previously described. A drive wheel means 564 and idler wheel means 566, 568, having vertical axes of rotation 570, 572, 574, are suitably constructed and arranged as previously described. Suitable belt engaging roller means 576 may be provided at plate intersections as necessary or desirable as previously described.

As shown in FIG. 12, in the alternative embodiment, the innermost half loop portion of the belt member 550, next adjacent the deco chain and the mandrel wheel means 22 and extending between belt wheels 564, 566, comprises a first portion 580 extending parallel to the rotational path 582 of mandrel wheel means 22, a second inclined intermediate portion 584, and a third portion 586 extending parallel to the path of movement 544 of deco chain portion 528. The first belt portion 580 includes a first container transfer zone 511 whereat the decorated containers are transferred by pressurized air from mandrels 91 onto coaxially aligned suction cup devices 120 as previously described. The decorated containers 134 are thereafter held on the suction cup devices 120 by vacuum supplied through the connecting nut devices 174 from vacuum slot means 320 and vacuum chamber means 562 as previously described. The decorated containers 134 on the suction cup devices are telescopically associated with the deco chain pin members 540 during conveyance along the inclined intermediate belt portion 584 so that, when the containers reach the straight path of movement of belt portion 586, the containers are initially in telescopic relationship with the pins 540 along a straight line path of movement parallel with the straight line path of movement of the pins and are held on the vacuum cup devices until the vacuum chamber means 562 is disconnected from the nut members 174 at the end of the vacuum slot means 320, as previously described, the location of which may be varied as necessary or desirable but which is preferably located as closely as possible to the drive sprocket wheel means 564 which is driven in synchronized timed relationship to the deco chain as previously described.

In order to accomodate the changes in direction of the belt member, the support plate means 558 may be made in multiple sections connected by suitably curved connecting plate portions 592, 594 as necessary or desirable or the adjacent end portions of the multiple sections may be mounted in abutting relationship and slightly rounded as necessary or desirable to assure proper engagement with the inner surface of the belt member. The configuration of the path of movement of belt members 100, 550 may be modified as necessary or desirable. For example, the path of the belt member 550 may be the same as the path configuration of the belt of FIGS. 1–10 and the path configuration of the belt member 100 may be modified to have the same path configuration as the belt member 550. The belt means 500 may be mounted by any suitable bracket means 596, 598 as generally previously described.

OPERATION

The apparatus of the present invention enables continuous transfer and conveyance of container members between first and second continuously moving container carrying apparatus, such as container mandrel wheel means 22 and deco chain means 25 or 520, by use of a continuous belt means 50 or 500. The belt means comprises a continuous loop belt member 102 or 550 which moves in a predetermined path between the mandrel wheel means and the deco chain means including a first path portion 122 or 580 located in juxtaposition to the mandrel wheel means for receiving container members therefrom and a second path portion 124 or 584 and/or 586 located in juxtaposition to the deco chain means for delivering container members thereto. A plurality of vacuum cup means, such as vacuum cup devices 120, are fixedly mounted on and continuously movable with the belt member in fixed relationship therewith for holding container members 134 thereon only by application of vacuum thereto during movement between the first and second continuously moving container carrying apparatus and for releasing the container members therefrom only by removal of vacuum therefrom. A connecting means 174 is associated with each vacuum device for connecting the vacuum cup device to the belt conveyor means and has a vacuum passage therein for connecting the vacuum chamber means 210 or 562 to the vacuum cup devices. The suction cup devices 120 are spaced, located, and driven in synchronous timed relationship to the deco chain means and the mandrel wheel means to obtain accurate axial alignment of the suction cup devices with the mandrels 91 and with the deco chain pin members 26 or 540 for more accurate transfer of containers therebetween. Continuous elongated vacuum chamber means 210 or 562 extend along the path of movement and are connected to each vacuum cup means adjacent to the first container carrying apparatus for receiving and holding container members delivered from the mandrels 91 thereof by pressurized air without relative axial movement therebetween and without simultaneous contact between the container members and the suction cup means and the first container carrying apparatus during transfer of the container members. In order to facilitate vacuum catching of the containers blown off the mandrels 91, a separate high vacuum chamber means 211 is preferably provided along the transfer zones 95 & 511. The vacuum chamber means is disconnected from each of the vacuum cup means adjacent the second container carrying apparatus for releasing the container members for supportive engagement therewith with or without relative movement therebetween at the time of release but without simultaneous contact of the container members with both the suction cup means and the second container carrying apparatus. The vacuum chamber means is continuously connected to each of the vacuum cup means for holding the container members thereon solely by applied vacuum during movement between the first container carrying apparatus and the second container carrying apparatus during non-supportive association with the second container carrying apparatus by relative telescopic movement between the chain pin members 26 or 540 and the container members.

While the present invention is particularly adapted for conveyance and transfer of containers to a deco chain, the inventive concepts may also be used in operations where a deco chain is not required such as where a curing oven is not required. In addition, the belt means may be variously positioned and arranged to accomodate various kinds and arrangements of container manufacturing apparatus including not only decorator system apparatus but also other kinds of manufacturing apparatus. Thus, it is intended the appended claims be construed to include various alternative modifications and embodiments of the invention except insofar as limited by the prior art.

What is claimed is:

1. Apparatus for continuously conveying decorated container members having wet ink images on the outer periphery thereof between a first continuously moving rotatable mandrel wheel type container carrying apparatus of a high speed container decorator or coater machine and a high speed second continuously linearly moving pin chain container carrying apparatus comprising:

a continuous one piece resilient flexible endless belt conveyor means movable in a predetermined endless path between the first and second continuously moving container carrying apparatus including a first path portion located in juxtaposition to the first continuously moving container carrying apparatus for receiving decorated container members therefrom and a second path portion located in juxtaposition to the second continuously moving container carrying apparatus delivering decorated container members thereto;

a plurality of individual longitudinally spaced vacuum cup means fixedly centrally mounted in longitudinal single file equally spaced relationship on and extending laterally outwardly of and being continuously movable with said continuous belt conveyor means in fixed relationship therewith for holding a single container member on each of said vacuum cup means, only by application of vacuum thereto during movement between the first and second continuously moving container carrying apparatus and for releasing container members therefrom only by removal of vacuum therefrom;

vacuum chamber means extending along the path of movement of and in substantially sealed relationship with said continuous belt conveyor means between the first and second continuously movable container carrying apparatus and being connected to each of said vacuum cup means adjacent to the first continuously moving container carrying apparatus for receiving and holding container members delivered therefrom and being disconnected from each of said vacuum cup means adjacent to the second continuously moving container carrying apparatus for releasing the container members for supportive engagement therewith and being continuously connected to each of said vacuum cup means during movement between the first continuously moving container carrying apparatus and the second continuously moving container carrying apparatus for holding the container members thereon solely by applied vacuum during non-supportive association with the second continuously moving container carrying apparatus;

a connecting means associated with each vacuum cup means and extending through and beyond said belt conveyor means for connecting said vacuum cup means to said belt conveyor means and having a vacuum passage therein for connecting said vacuum chamber means to said vacuum cup means;

belt guide means extending between the first and second container carrying apparatus for slidably sealably receiving and guiding said belt conveyor means therebetween;

elongated relatively narrow width guide slot means associated with said belt guide means for slidably receiving and guiding said connecting means and being connected to said vacuum chamber means for continuously supplying vacuum to said vacuum cup means during movement between the first and second container carrying apparatus; and wheel means for guidably supporting said belt conveyor means and having slot means for receiving said connecting means.

2. The invention as defined in claim 1 and wherein said vacuum chamber means comprising:

a first relatively high vacuum chamber means located next adjacent the first continuously moving container carrying apparatus for applying high vacuum to said vacuum cup means at the time of transfer of the container members to said vacuum cup means; and a second relatively low vacuum chamber means extending from said first relatively high vacuum chamber means to the second continuously moving container carrying apparatus for retaining the container members on said vacuum cup means after transfer of the container members thereto until release of the container members adjacent the second continuously moving container carrying apparatus.

3. The invention as defined in claim 1 and wherein said wheel means comprising:

a drive wheel means drivably associated with said belt conveyor means and each of said connecting means for causing movement of said belt conveyor means and said suction cup means.

4. The invention as defined in claim 3 and wherein said wheel means further comprising:

guide wheel means guidably associated with said belt conveyor means and each of said connecting means for guiding the movement of said belt conveyor means and said suction cup means.

5. The invention as defined in claim 4 and further comprising:

a plurality of auxiliary guide and drive means fixedly mounted on said belt conveyor means in juxtaposition to said vacuum cup means for association with said drive wheel means.

6. The invention as defined in claim 5 and wherein:

said auxiliary guide and drive means being aligned with and alternately spaced between said vacuum cup means and having a configuration the same as the configuration of said connecting means.

7. The invention as defined in claim 6 and wherein:

said belt conveyor means having a first portion located in juxtaposition to the first continuously moving container carrying apparatus and being movable in timed parallel relationship relative thereto and having a path of movement substantially parallel to the path of movement thereof.

8. The invention as defined in claim 7 and the first continuously moving container carrying apparatus being a mandrel wheel means associated with ink applicator means of container decorator apparatus and comprising:

a plurality of circumferentially spaced mandrel means rotatable in a circular path for carrying container members to the ink applicator means for decoration and for carrying decorated container members in an arcuate path from the ink applicator means into juxtaposition with said first portion of said belt conveyor means;

vacuum means associated with said mandrel means to hold the container members thereon during movement relative to the ink applicator means and to said first portion of said belt conveyor means;

pressurized air means associated with said mandrel means to blow the decorated container members from said mandrel means onto said suction cup means on said first portion of said belt conveyor means; and cam means associated with said mandrel means for causing substantially parallel linear movement of the decorated container members relative to said first portion of said belt conveyor means during transfer of the container members to said suction cup means.

9. The invention as defined in claim 8 and wherein the second continuously moving container carrying apparatus being a chain apparatus and:

said belt conveyor means having a second portion located in juxtaposition to the chain apparatus and being movable in time relationship relative thereto and having a path of movement generally parallel to the path of movement of the chain apparatus.

10. The invention as defined in claim 9 and wherein:

said second portion of said belt conveyor means being associated with said drive wheel means and being movable therearound in an arcuate path of movement after association of the container members with the chain apparatus.

11. The invention as defined in claim 10 and wherein:

said second portion of said belt conveyor means movable in timed converging relationship relative to the chain apparatus and having a path of movement convergent with the path of movement of the chain apparatus whereby the container members are located in juxtaposition to the chain apparatus prior to release thereon.

12. The invention as defined in claim 11 and wherein:

said second portion of said belt conveyor means also having a path of movement next adjacent said drive wheel means extending substantially parallel to the path of movement of the chain apparatus.

13. The invention as defined in claim 12 and wherein:

said vacuum cup means and said vacuum chamber means are constructed and arranged so that vacuum from said vacuum chamber means is effective in said suction cup means to hold the container members on said suction cup means until the container members reach said second portion of said belt conveyor means and are traveling along a path of movement substantially parallel to the path of movement of the chain apparatus.

14. The invention as defined in claim 9 and wherein:

said mandrel wheel means being rotatable about a horizontal axis of rotation; and the path of movement of said belt conveyor means extending in a generally vertical direction.

15. The invention as defined in claim 9 and wherein:

said mandrel wheel means being rotatable about a horizontal axis of rotation; and the path of movement of said belt conveyor means extending in a generally horizontal direction.

16. The invention as defined in claim 15 and wherein the chain apparatus comprising:

a continuous chain member having spaced container supporting pin members therein;

pair of laterally spaced chain sprocket members having generally horizontally extending upwardly inclined axes of rotation;

a portion of said chain member extending horizontally between said chain sprocket means and having a horizontal path of movement therebetween; and said second portion of said belt member being located in juxtaposition to said portion of said chain member.

17. The invention as defined in claim 1 and wherein said belt guide means comprising:

an elongated support plate member having a flat surface facing said belt member;

a relative wide elongated mounting slot centrally longitudinally located in said support plate member facing said belt member and extending through said flat surface;

low coefficient of friction belt guide and support means mounted in said elongated mounting slot and having flat outer surface portions extending laterally outwardly beyond said flat surface of said support plate member and being engageable with central portions of said belt member and locating said central portions outwardly of said flat surface and defining said guide slot means for reducing frictional forces generated by the movement of said belt member and said connecting means; and a relative narrow width vacuum slot centrally longitudinally located in said support plate member being connected to said elongated mounting slot and to said guide slot means for supplying vacuum to said connecting means.

18. The invention as defined in claim 17 and wherein said belt conveyor means comprising:

a continuous loop belt member made of high strength lightweight substantially air impervious material and having a rectangular cross section defined by opposite relatively closely spaced parallel inner and outer side surfaces and relatively widely spaced edge surfaces.

19. The invention as defined in claim 1 and wherein each of said connecting means comprising a frusto-conical nut member.

20. The invention as defined in claim 19 and wherein said guide slot means having tapered side surfaces generally corresponding to the size and shape of the nut members and slidably guidably receiving the nut members.

21. The invention as defined in claim 20 and wherein said wheel means comprising:

a drive wheel means for driveable engagement with the nut members; and said slot means comprising peripherally spaced drive slots having tapered side surfaces generally corresponding to the size and shape of the nut members and driveably receiving the nut members.

22. The invention as defined in claim 21 and further comprising:

drive means for connecting said drive wheel means to the second continuously moving container carrying apparatus for driving said continuous belt conveyor means in synchronized timed relationship with the second continuously moving container carrying apparatus.

23. The invention as defined in claim 22 and wherein said wheel means further comprising:

idler wheel means having a continuous circumferentially extending slot having tapered side surfaces generally corresponding in size and shape to the nut members for slidably guidably receiving the nut members.

24. The invention as defined in claims 22 or 23 wherein said wheel means having a peripheral belt support surface approximately equal to or greater than the width of said belt conveyor means.

* * * * *